(12) United States Patent
Balbarin et al.

(10) Patent No.: US 10,245,548 B2
(45) Date of Patent: *Apr. 2, 2019

(54) INJECTION LANCE ASSEMBLY

(71) Applicant: United Conveyor Corporation, Waukegan, IL (US)

(72) Inventors: Jon Balbarin, Hawthorn Woods, IL (US); Daniel E. Charhut, Lake Bluff, IL (US); Robert Heywood, Antioch, IL (US); Robert LeDain, Fox Lake, IL (US); Saurabh Rastogi, Green Oaks, IL (US)

(73) Assignee: United Conveyor Corporation, Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,718

(22) Filed: Sep. 25, 2017

(65) Prior Publication Data

US 2018/0126324 A1    May 10, 2018

Related U.S. Application Data

(63) Continuation-in-part of application No. 15/402,123, filed on Jan. 9, 2017, now abandoned, and a continuation-in-part of application No. 14/456,874, filed on Aug. 12, 2014, now Pat. No. 9,539,535, and a continuation of application No. 13/771,938, filed on Feb. 20, 2013, now Pat. No. 8,801,841, and a
(Continued)

(51) Int. Cl.
*B01D 53/02* (2006.01)
*B01D 53/12* (2006.01)
*B01D 53/83* (2006.01)
*B01D 53/40* (2006.01)
*B01D 53/10* (2006.01)
*B01D 53/50* (2006.01)
*B01D 53/68* (2006.01)

(52) U.S. Cl.
CPC ............. *B01D 53/12* (2013.01); *B01D 53/10* (2013.01); *B01D 53/40* (2013.01); *B01D 53/508* (2013.01); *B01D 53/685* (2013.01); *B01D 53/83* (2013.01); *B01D 2251/304* (2013.01); *B01D 2251/402* (2013.01); *B01D 2251/404* (2013.01); *B01D 2251/604* (2013.01); *B01D 2251/606* (2013.01); *B01D 2257/2045* (2013.01); *B01D 2257/302* (2013.01); *B01D 2258/0283* (2013.01); *B01D 2259/128* (2013.01)

(58) Field of Classification Search
CPC ........ B01D 2251/402; B01D 2251/404; B01D 2257/2045; B01D 2257/302; B01D 2259/128; B01D 53/10; B01D 53/12; B01D 53/40; B01D 53/83; H01R 9/0521
See application file for complete search history.

(56) References Cited

U.S. PATENT DOCUMENTS

| | | | | |
|---|---|---|---|---|
| 4,564,298 A | * | 1/1986 | Gritters | B01F 5/045 137/896 |
| 4,753,535 A | * | 6/1988 | King | B01F 5/0451 366/174.1 |

(Continued)

*Primary Examiner* — Christopher P Jones
(74) *Attorney, Agent, or Firm* — Vitale, Vickrey, Niro & Gasey

(57) ABSTRACT

An injection lance assembly for creating a higher degree of turbulence and dispersion of a treating agent into a fluid stream.

12 Claims, 12 Drawing Sheets

Related U.S. Application Data continuation of application No. 14/456,874, filed on Aug. 12, 2014, now Pat. No. 9,539,535.

(56) References Cited

U.S. PATENT DOCUMENTS

| | | | | |
|---|---|---|---|---|
| 6,135,629 | A * | 10/2000 | Dohmann | B01F 5/0451 366/181.5 |
| 8,011,601 | B2 * | 9/2011 | Denlinger | B01D 53/79 239/10 |
| 8,083,156 | B2 * | 12/2011 | Miller | B01D 53/79 239/10 |
| 8,801,841 | B1 * | 8/2014 | Balbarin | B01D 53/12 239/10 |
| 9,539,535 | B2 * | 1/2017 | Balbarin | B01D 53/12 |
| 2009/0293721 | A1 * | 12/2009 | Miller | B01D 53/79 95/107 |
| 2014/0030178 | A1 * | 1/2014 | Martin | B01D 53/685 423/230 |

\* cited by examiner

CLOSED

OPEN

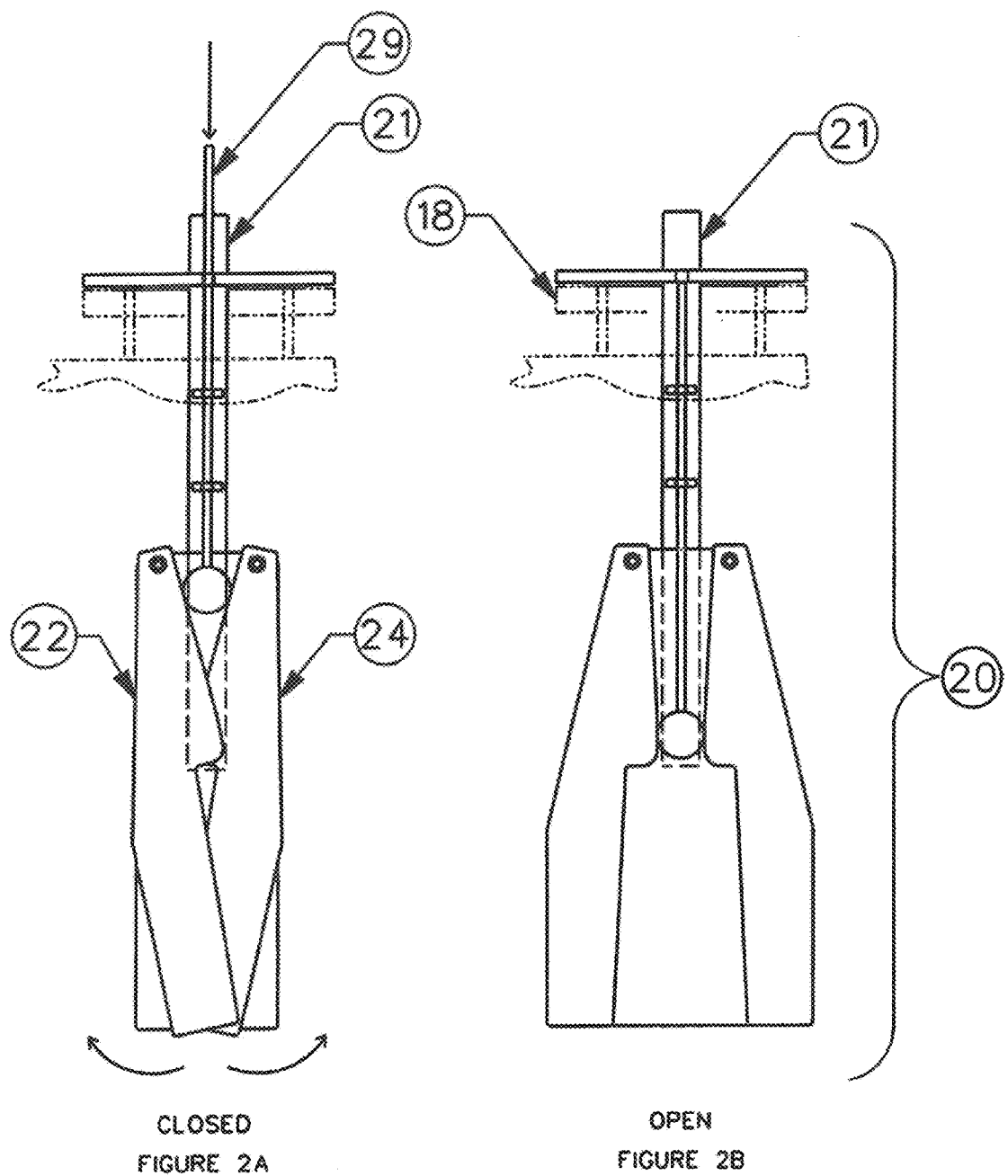

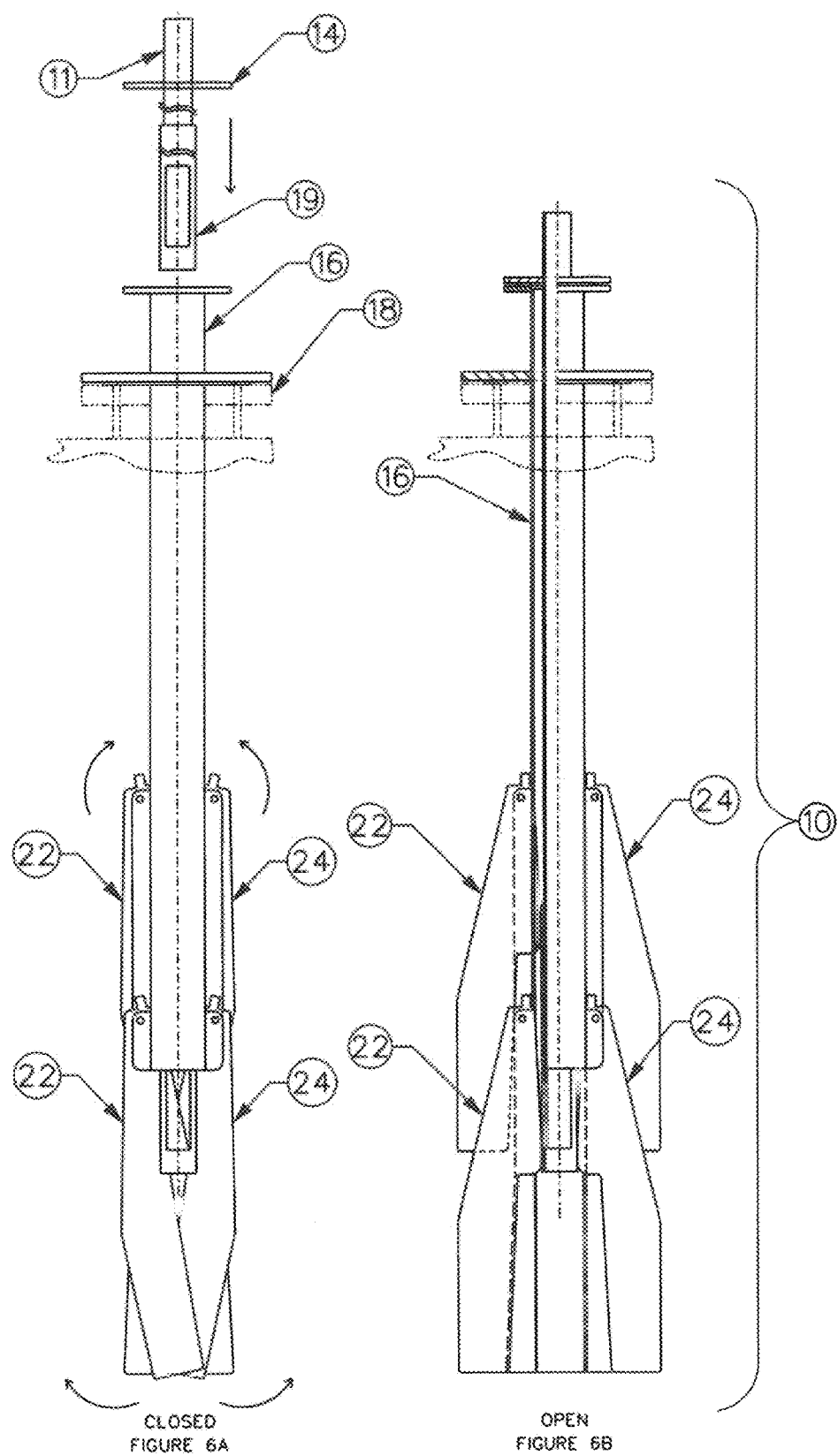

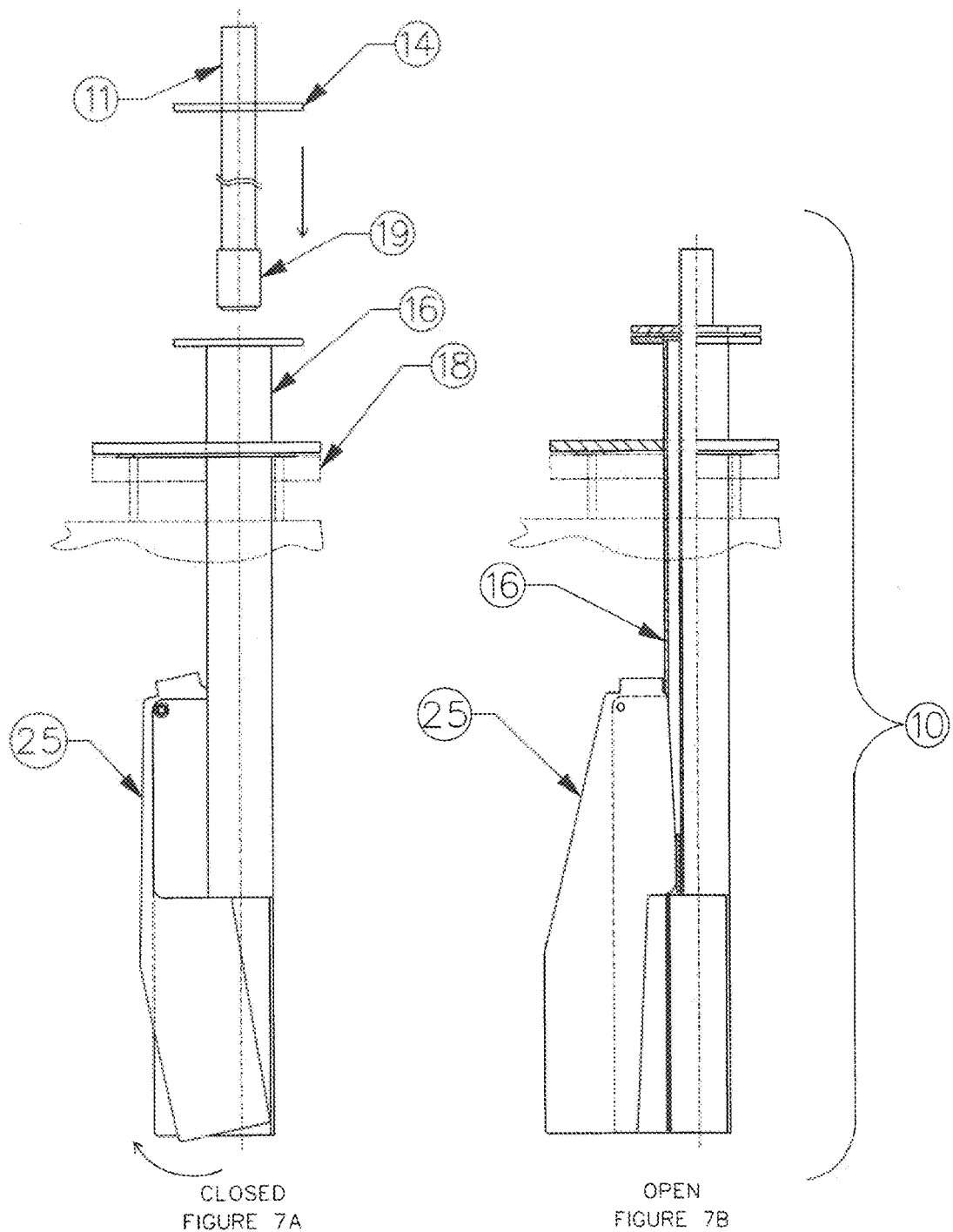

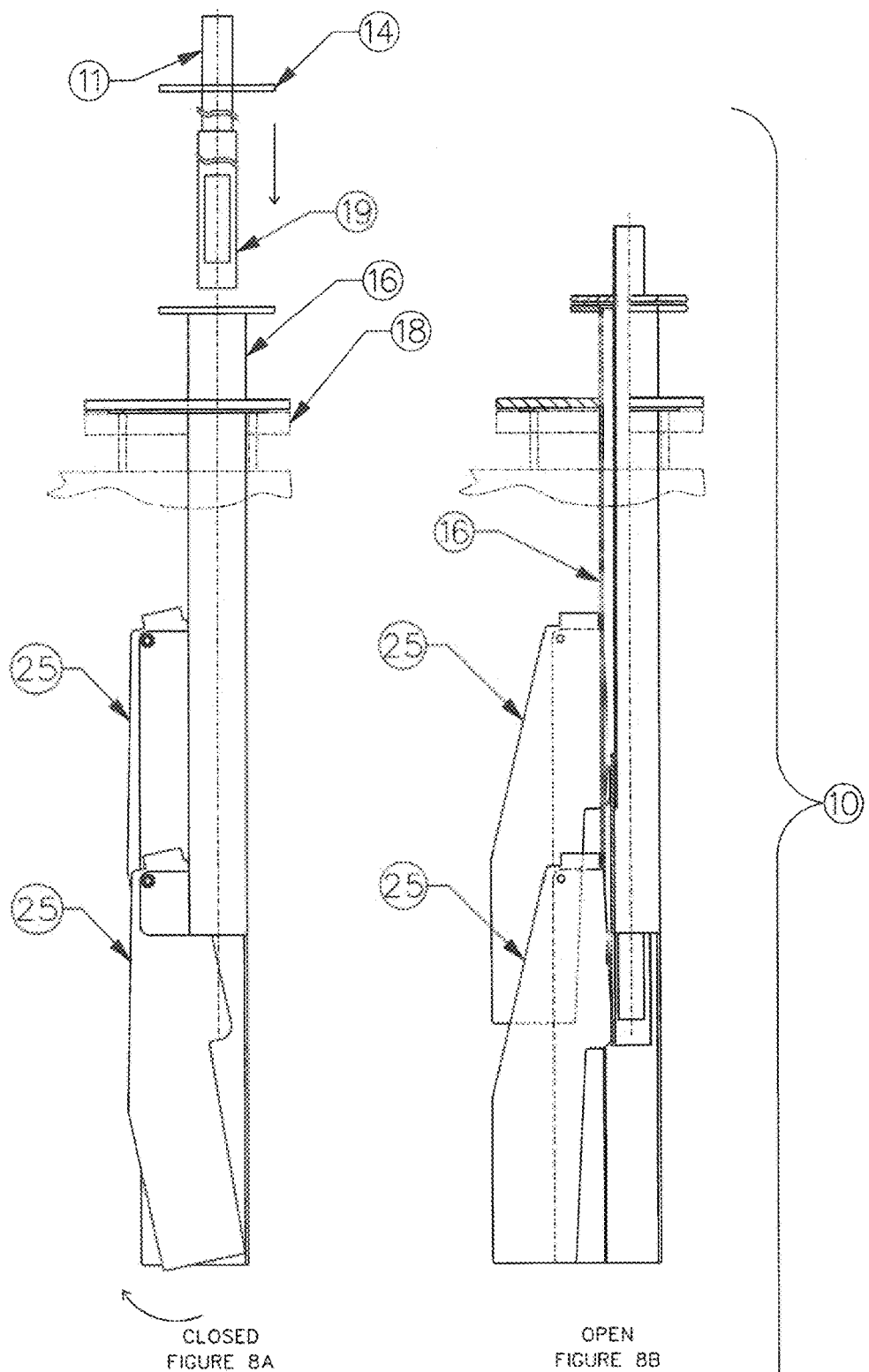

CLOSED

VARIABLE OPEN POSITION

CLOSED

VARIABLE OPEN POSITION

INJECTION LANCE ASSEMBLY

FIELD OF INVENTION

The present invention relates to a system and method for more efficient treatment of pollutants from a fluid stream in a dry sorbent injection process. Specifically, the present invention relates to an injection lance assembly for creating a higher degree of turbulence and dispersion of a treating agent into a fluid stream. The assembly preferably includes lance which is disposed through a port, shroud or opening of the ductwork into the fluid stream so as to disperse a sorbent material therethrough. The assembly further includes a blade or barrier which may be expanded or rotated to buffer or disturb a portion of the fluid flow. Specifically, the rotation of the blade or barrier creates a larger diameter for assembly than the diameter of the port through which the lance was inserted. Thus, a system and method for improving the efficiency of the dispersion into a dry sorbent injection system is disclosed.

BACKGROUND OF THE INVENTION

With the increase in environmental oversight, operators of power plants are pushing to discover new and better ways to remediate potential pollutants which are the byproducts of the power generation process. A variety of approaches have been developed for removal or mitigation of such byproducts resulting from coal fired power plants. One known approach is the use of dry sorbent injection (DSI) systems to reduce acid gas levels, such as such as sulfur dioxide (SO2), sulfur trioxide (SO3), sulfuric acid (H2SO4), and hydrochloric acid (HCl). DSI involves the addition of an alkaline material (such as sodium bicarbonate, hydrated lime, or trona) into various locations of the power plant system such that the acid gases react with the alkaline sorbents to form solid salts which are removed via a particulate control device.

While DSI is a cost effective control solution, it is not without its own processing challenges. For example it is common as one step of the process to disperse solid particles of alkaline materials or other treating agent such into the gas or fluid stream in order to react with the undesired component. Those of skill in the art know dispersion lances may be used to disperse the solid particles of treating agent into the gaseous stream. Simple ejection of the particles from such nozzles, however, is not very effective in generating thorough mixing of the particles with the gas stream. Furthermore, the process can create buildup of particulate on the lance tips such that the dispersion of solids may be impacted.

It is also known to use a variety of lance assemblies permit dispersion of the particulate into the fluid stream. Existing configurations, however, have achieved only limited success in improving the dispersion of the ejected particle streams. Accordingly, a need has existed for an injection lance assembly which is fully able to produce the highly turbulent conditions required for full and effective dispersion and mixing into the gas stream of the injected particles of the treating agent.

A further limitation of the existing lance injection systems is the transient nature of the use of such injection lances. Namely, there is not necessarily a constant need for injection lances to disperse particulate into a fluid stream. Conversely, there may be a need for multiple lance systems and/or multiple injection points in the fluid stream path to maximize the efficiency of the treatment process. For instance, changes in the flow rate or other characteristics of the fluid stream may require the removal or movement of such lances. Furthermore, such changes may likewise require movement or addition of baffles or other structures to create a turbulent flow wherever such lances may be placed. However, simply adding permanently deployed baffles at multiple points in the system may result in a cumulative, deleterious impact on the pressure drop for the fluid stream being processed.

In addition, the ability to add removable structures for creating a turbulent flow at the point(s) of particulate dispersion is limited as a practical matter. Specifically, the access points that are available for inserting an injection lance are typically of a limited diameter relative to the ductwork carrying the fluid stream. However, if the baffles or similar structures are sized such that the diameter is sized to fit through the access points involved, the resulting use may provide insufficient turbulence. If the particulate cannot be better dispersed in the fluid stream to be treated, the system may require higher levels of particulate for treatment or, even worse, the system may be limited in its ability to treat the undesirable emissions within the fluid stream.

Thus, the present state of the art reflects a need for an insertable lance injection system for use in ductwork with limited access points, wherein the system enables a broad turbulent regent for improved dispersion of a solid particulate into a fluid stream for use with dry sorbent injection processes and the like.

DESCRIPTION OF THE PRIOR ART

One example of a prior art approach is found in U.S. Pat. No. 8,083,156 B2 (Miller et al.). That invention teaches a lance system for dispersing a treating agent into a fluid treatment system that includes a flow duct in which a fluid stream flowing through the duct is mixed with the treating agent. The apparatus is based on a multi-pipe lance positioned in the stream flow, where each pipe supplies a number of feed discharge nozzles, and the individual pipes branch off from the same location. Miller specifically teaches the use of multiple parallel pipes, with each of the parallel pipes having one or more openings along their lengths for discharging a treating agent into a fluid stream. Such an arrangement, by definition, will require a larger collective diameter of pipes, and thus will occupy a greater volume within the fluid stream. Furthermore, nothing in Miller suggests a removable lance assembly, nor does it teach or suggest a process to enable removable baffles or similar structures using access points of limited diameter. In short, Miller fails to suggest or teach how to provide a removable lance injection system with a structure for create a zone of turbulence in the fluid stream that is larger than the access point(s) through which the lance system is inserted.

Another approach known in the art is shown (by way of example), in literature provided by the Industrial Accessories Company (see, e.g., http://www.iac-intl.com/literature/PP024_SO3_Mitigation_Strategies_9-14-10.pdf). This approach teaches the use of multiple lances, each having a different length. The design further teaches the use of a "bayonet tip" as purporting to help with even dispersion. This approach, however, creates difficulty insofar as it requires multiple lance designs to be switched in and out of a given access port. Furthermore, this design fails to teach any ability to create a zone of turbulence in the ductwork which exceeds the diameter of the given lance being employed.

What is needed is simple, cost effective and injection lance system for enabling an insertable and/or removable injection lance system, including a structure for generating a turbulence zone in the fluid stream which is greater in diameter than the access point through which the injection lance is placed.

Definition of Terms

The following terms are used in the claims of the patent as filed and are intended to have their broadest plain and ordinary meaning consistent with the requirements of the law.

A "wing" means a baffle, projection, or similar structure which may be moved from a first retracted position to a second deployed position to create a zone of turbulence for the treating agent being mixed with the fluid stream. In its first retracted position, the wing is either substantially in line with or surrounds the injection lance that it operates with such that the wing does not extend substantially beyond the shroud or lance to which it is attached.

A "blade" means the blade, propeller or similar structure which creates a zone of turbulence for the treating agent being mixed within the fluid stream. The blade has a first, secured position to enable displacement through an access point, but in operation the blade moves to create a rotational diameter greater than the access point through which it is displaced.

An "actuator" or "means for actuating" refers to a spring bias, a punch rod, a cable or similar structure for enabling the movement of a blade or wing from its first secured position to the second operational position.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus and method of the present invention generally includes a lance assembly for distributing particulate into a fluid stream for treating contaminants, such as employed in a dry sorbent injection process or the like. The lance assembly includes a lance or similar tubular structure for inserting particulate (e.g., trona) therethrough into the fluid stream. The lance assembly further includes a barrier, such as a wing or a blade, which typically may be attached to a shroud extending through the port which the lance is inserted, or (alternatively) in an adjacent port. The wing or blade includes a first, retracted position that permits it to minimize or eliminate the profile of the barrier in the fluid stream, and a second, deployed position which expands the surface area of the wing or blade such that the breadth of the surface area of the blade or wing is greater than the diameter of the access port through which the lance is inserted. The lance assembly further includes a structure for urging the wing from the first position to the second position, as well as a structure for reversing the positioning of that barrier for removing the lance assembly.

The immediate application of a present invention will be seen in processing sorbent and similar particulate for pollution control from operating plants in dry sorbent injection processes, though those of skill will see that the present invention could be applied to other fields requiring a simple and robust solution for providing a solid particulate into a fluid stream for treatment.

Thus can be seen that one object of the present invention is to provide a cost effective system for dispersing solid particulate into a fluid stream.

A further object of the present invention is to provide a lance injection assembly which inhibits the buildup of solid particulate on the tip of the lance being used.

Still another object of the present invention is to provide an insertable lance assembly through an access port for actuating a barrier, such as a blade or wing, which can be displaced, with the barrier as deployed having a diameter substantially greater than the diameter of the access port.

Yet another object of the present invention is to provide a lance assembly which includes a barrier such as a wing or blade, which may be retracted or removed at multiple points in the ductwork.

Still another object of the present invention is to provide a lance assembly which does not permanently deploy baffles or similar structures to create a zone of turbulence for dispersing particulate therethrough.

It should be noted that not every embodiment of the claimed invention will accomplish each of the objects of the invention set forth above. In addition, further objects of the invention will become apparent based the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

BRIEF DESCRIPTION OF THE DRAWINGS

FIGS. 2a and 2b shows side views of the closed and open positions, respectively, of a second preferred embodiment of the invention using a pair of wings and a push rod configuration.

FIGS. 6A and 6B show a front view of closed and open positions of a sixth preferred embodiment of the invention using a plurality of pairs of wings.

FIGS. 7A and 7B show a front view of closed and open positions of a seventh preferred embodiment of the invention using a single eccentric wing.

FIGS. 8A and 8B show a front view of closed and open positions of a eighth preferred embodiment of the invention using two eccentric wings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figures 1A, 1B:
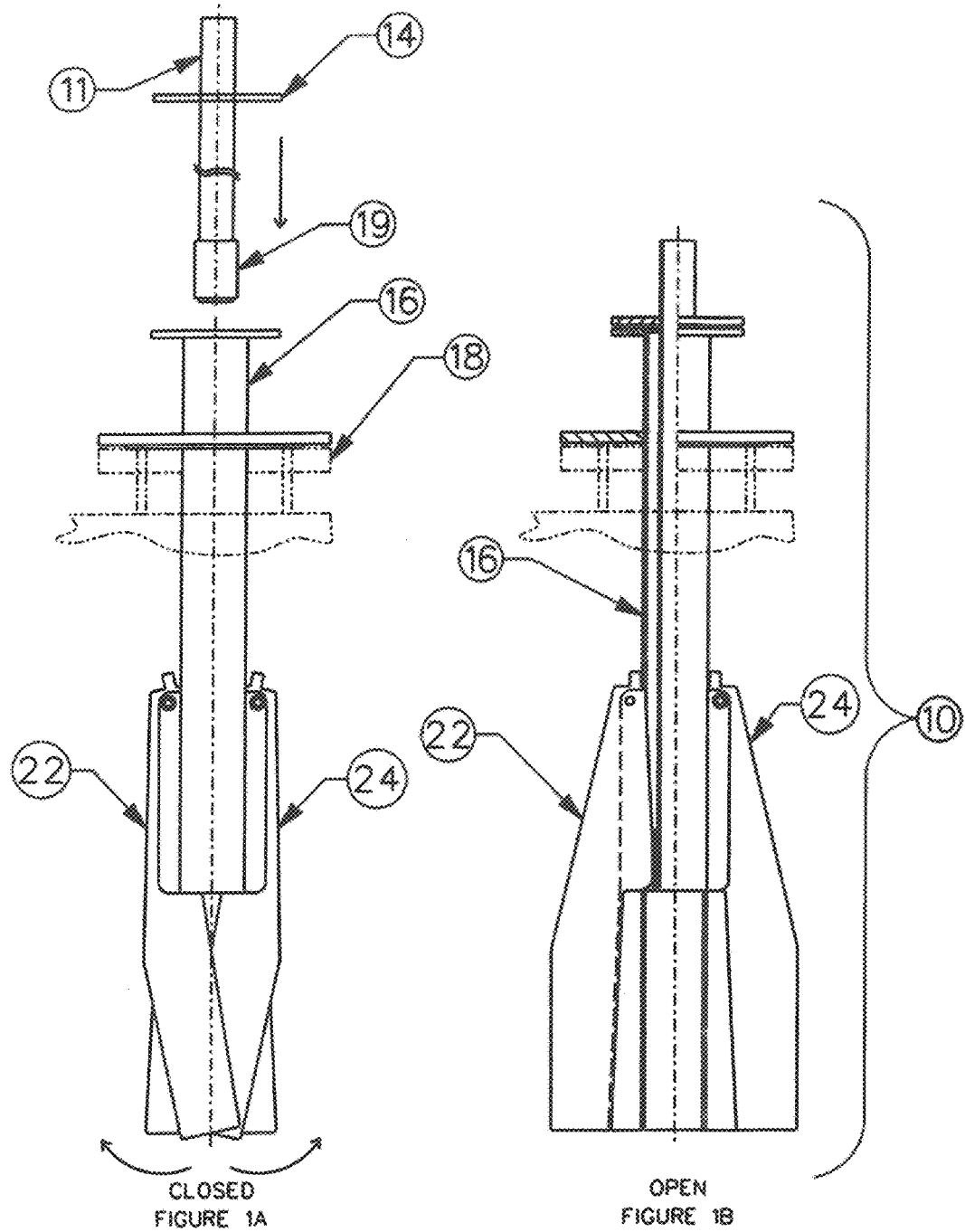
FIGS. 1a and 1b shows sides views of the closed and open positions, respectively, of a first preferred embodiment of the invention using a pair of wings and a tip configuration.
Figure 3:
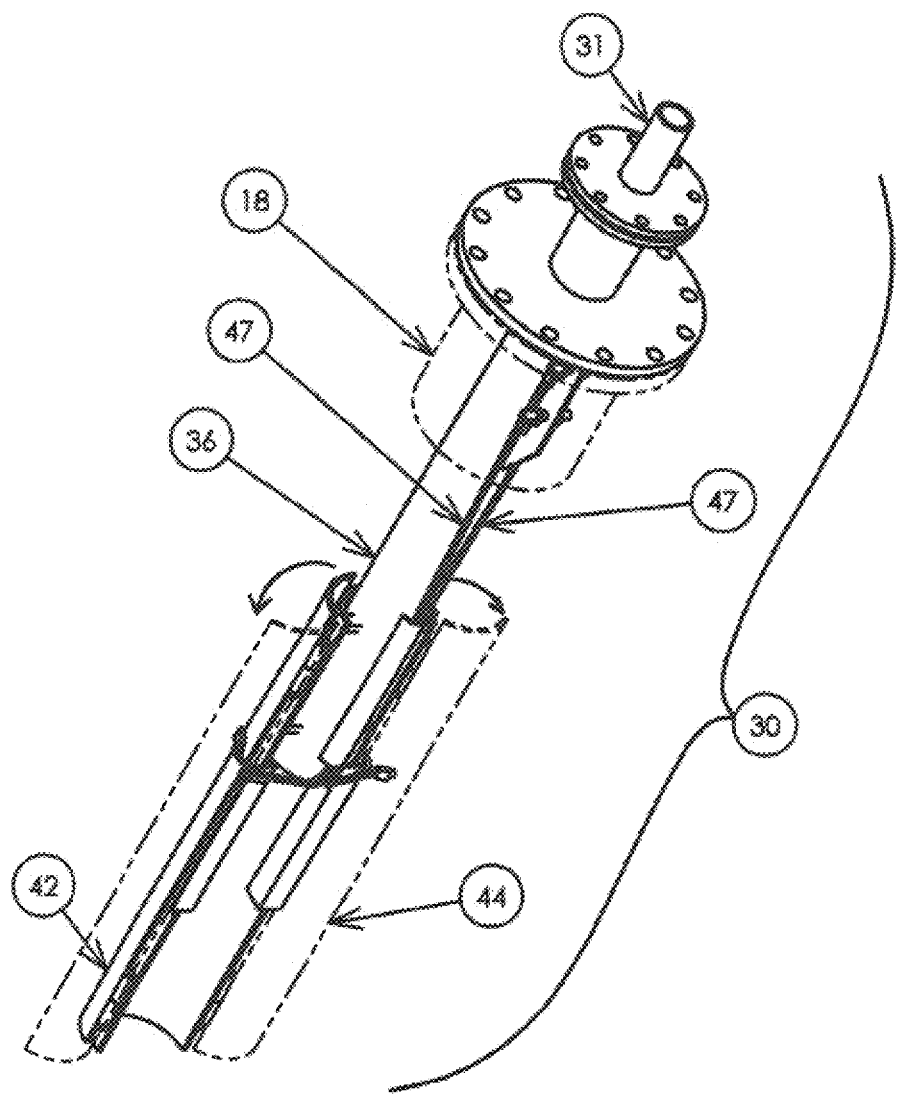
FIG. 3 shows a perspective view of a third preferred embodiment of the invention using a rotating wings configuration.
Figure 4:
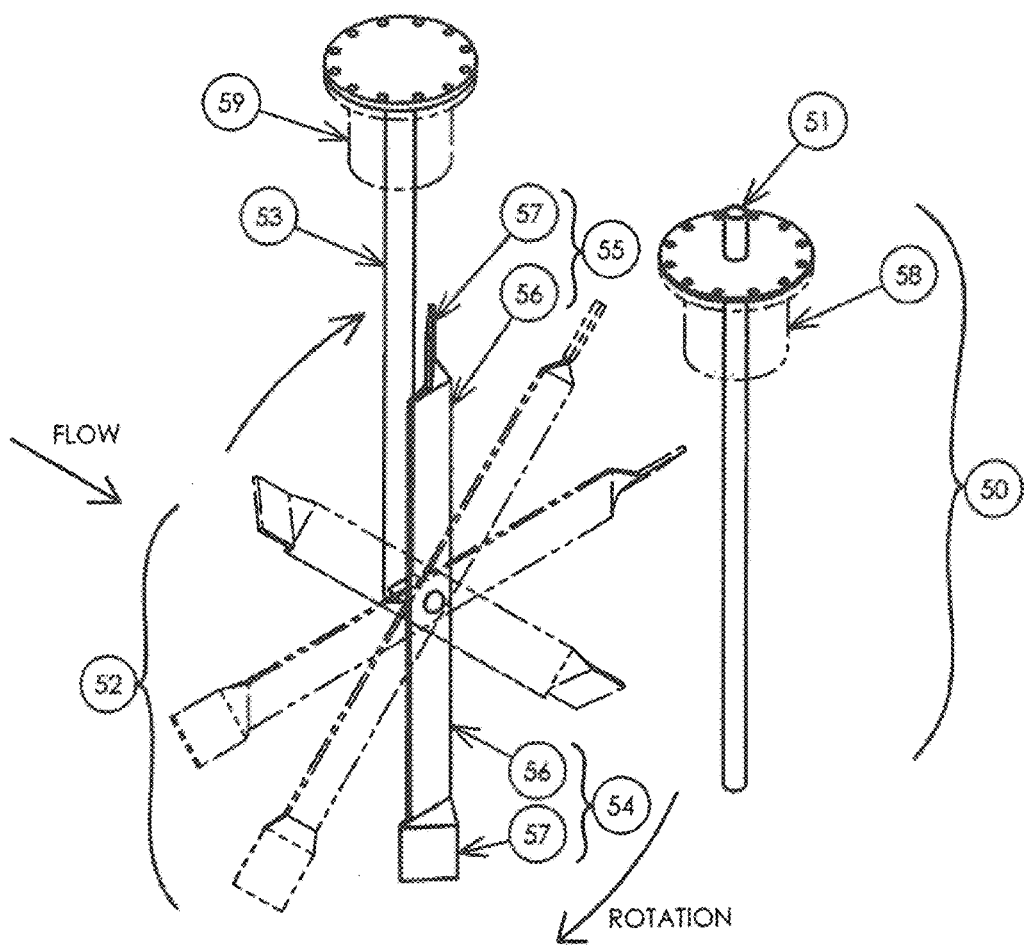
FIG. 4 shows a perspective view of a fourth preferred embodiment of the invention using a downstream propeller blade configuration.
Figure 5:
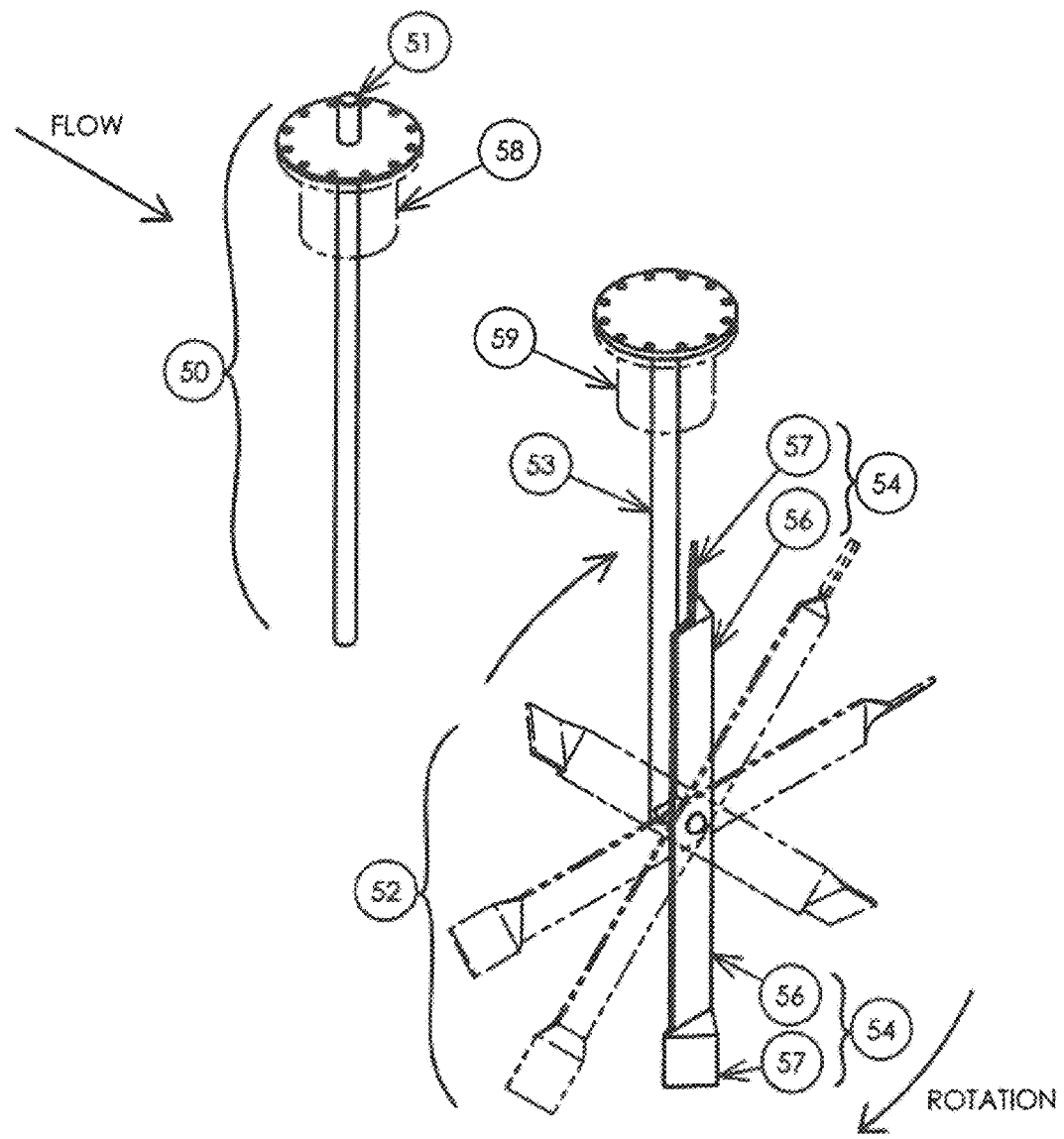
FIG. 5 shows a perspective view of a fifth preferred embodiment of the invention using an upstream propeller blade configuration.
Figures 9A, 9B:
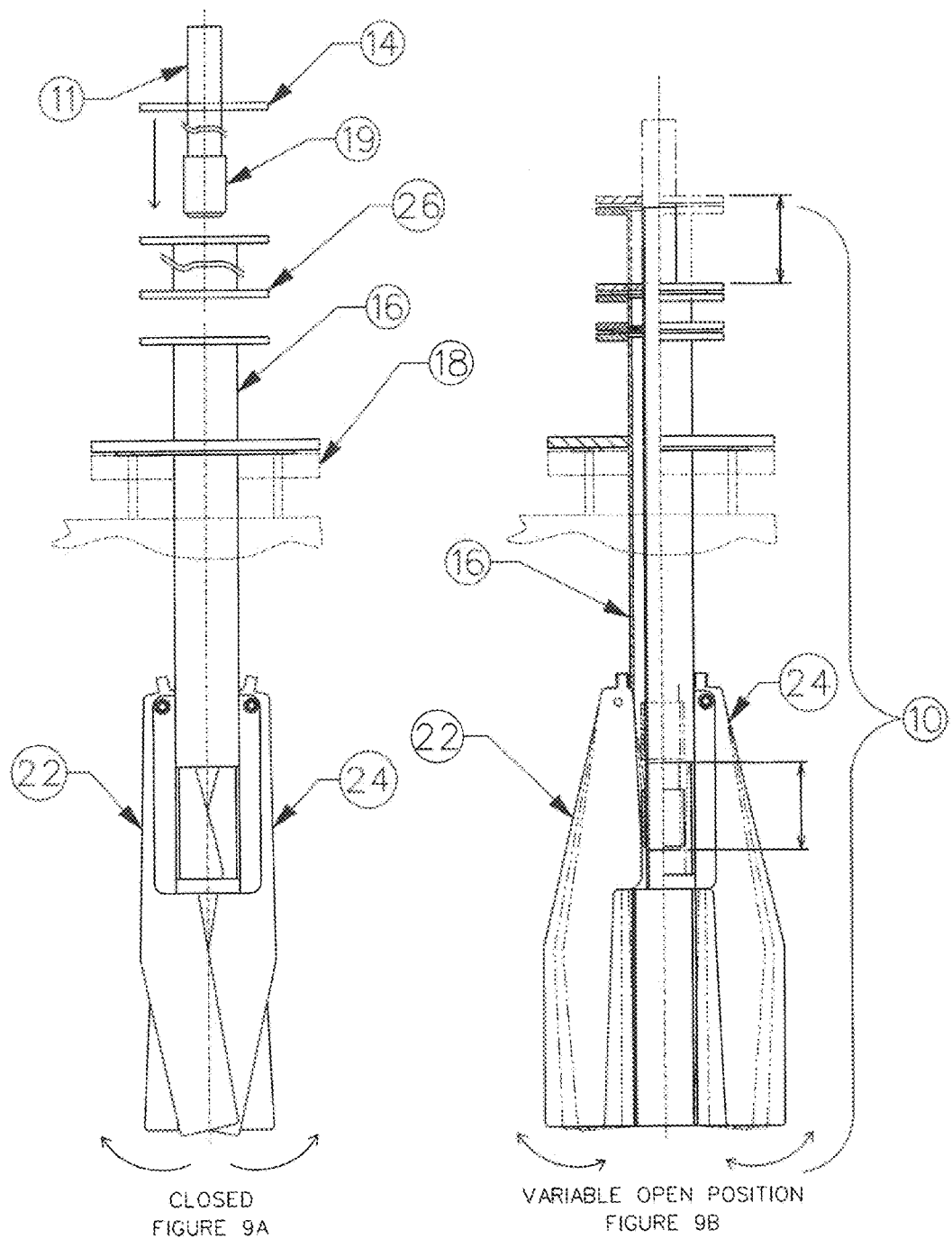
FIGS. 9A and 9B show a front view of closed and open positions of a ninth preferred embodiment of the invention using a variable deployment pair of wings.
Figures 10A, 10B:
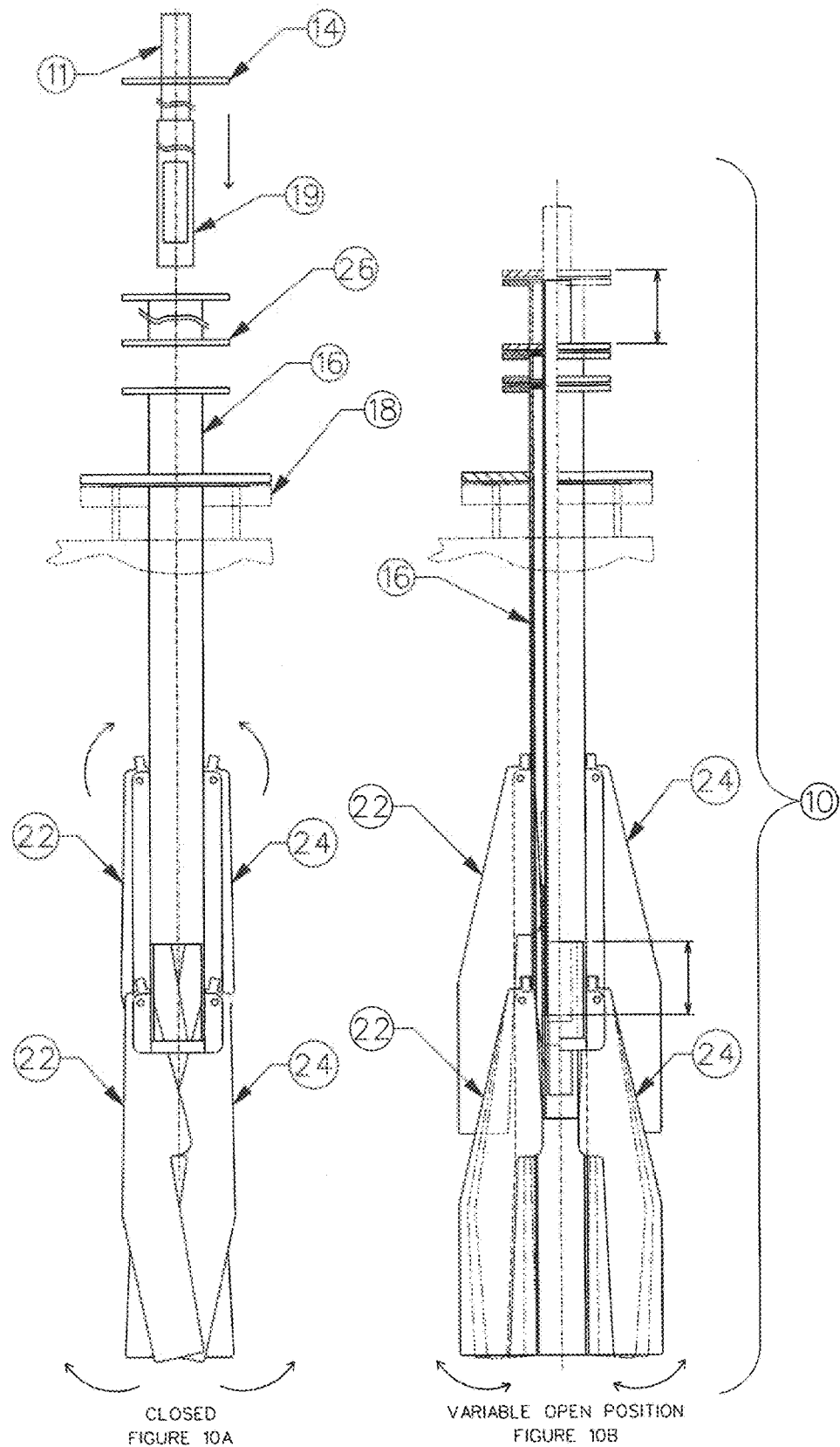
FIGS. 10A and 10B show a front view of closed and open positions of a tenth preferred embodiment of the invention using a variable deployment of two pairs of wings.
Figure 11A:
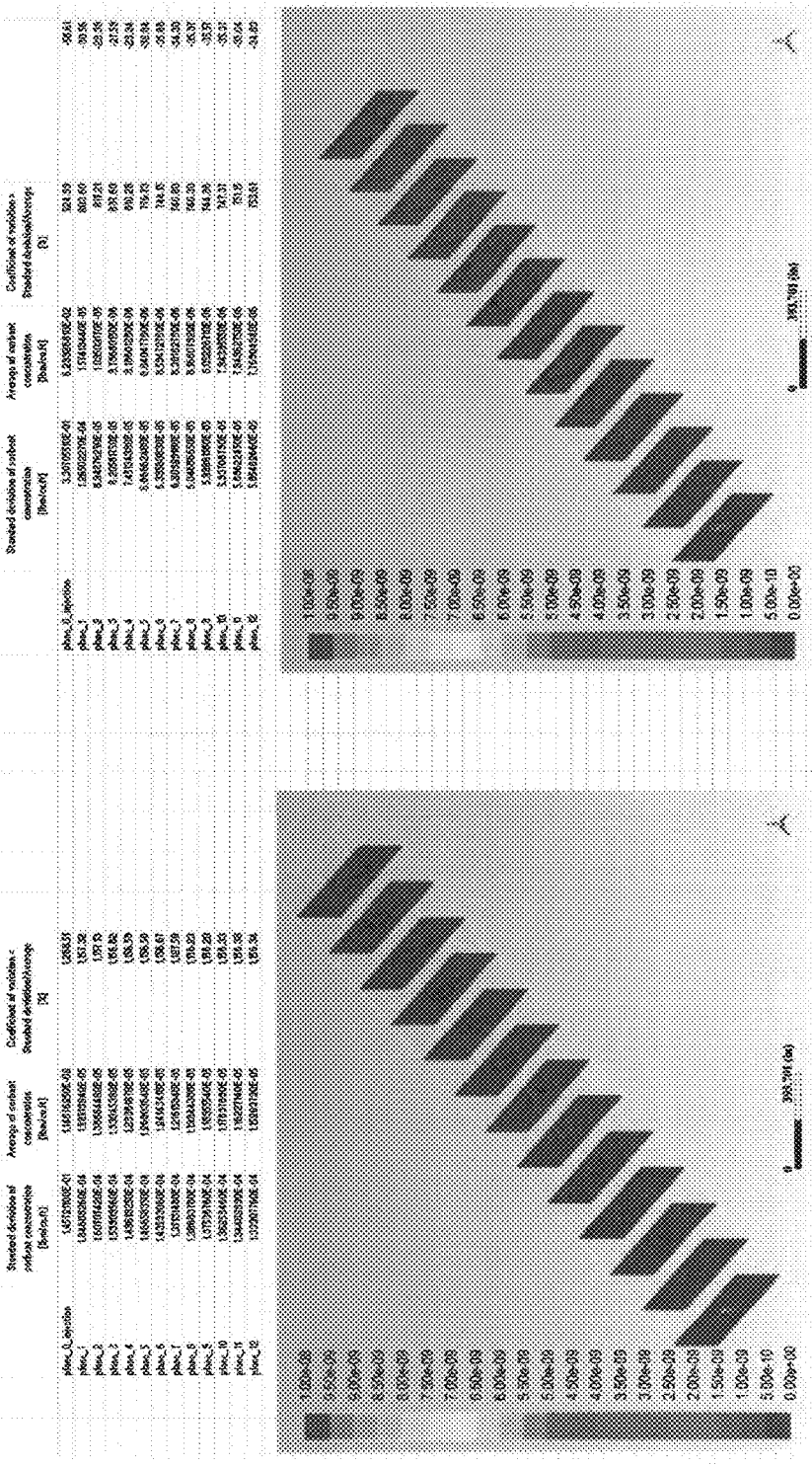
FIG. 11A shows CFD modeling results comparing the two part and single wing pair embodiments of the present invention.
Figure 11B:
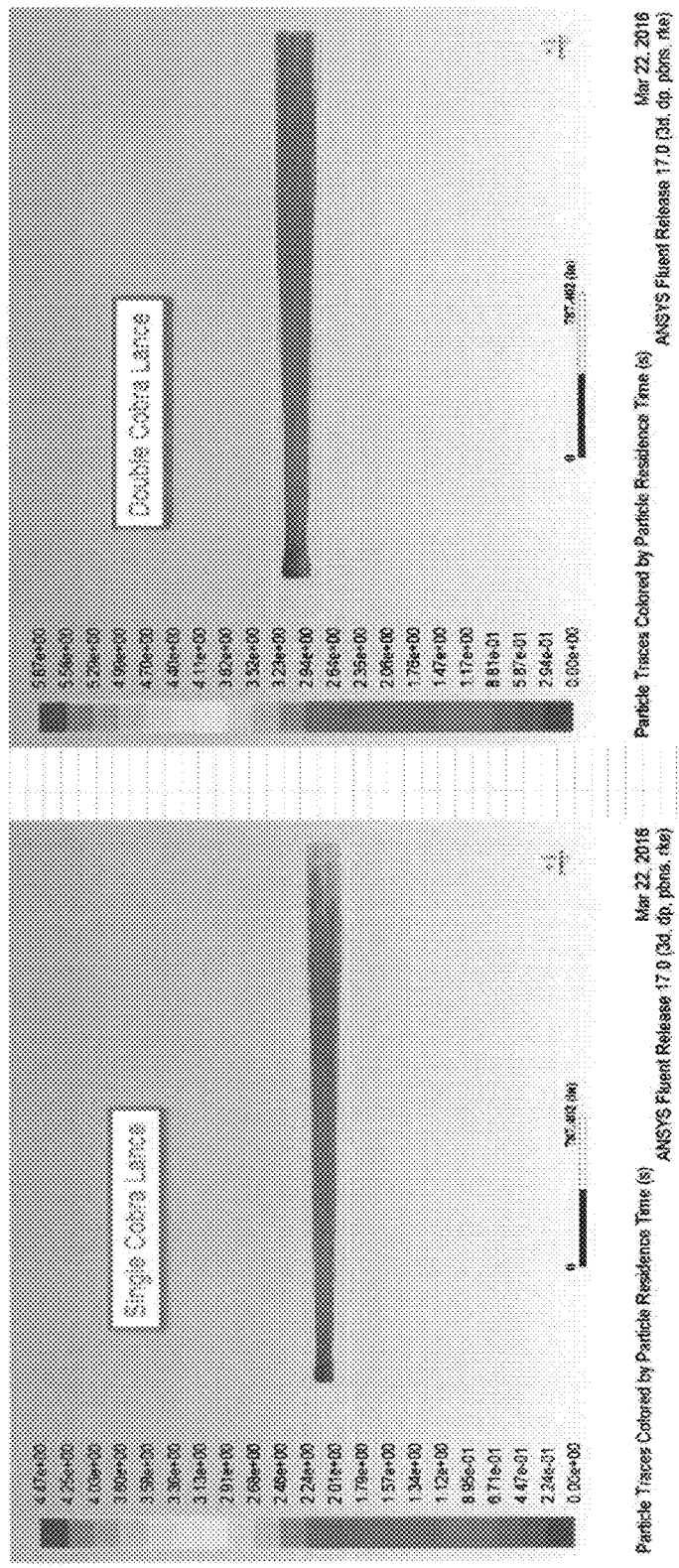
FIG. 11B shows additional CFD modeling results comparing the two part and single wing pair embodiments of the present invention.

FIGS. 1a and 1b show a first preferred embodiment of a lance injection assembly 10 constructed in accordance with the present invention in closed and open positions, respectively. The lance injection assembly 10 includes a tube 11 or hollow shaft for receiving solid particulate therethrough, and further preferably includes a seating member 14 or collar for resting upon a shroud 16 when inserted into the ductwork 18. The shroud 16 of this embodiment has attached thereto a pair of wings 22, 24 by a hinged arrangement. The wings 22, 24 when retracted fold at least partially within the shroud 16 via slits or openings (not shown) and/or (alternatively) the wings 22, 24 will fold over one another and hang below the opening of the shroud 16 within the ductwork 18. Thus, in this first retracted or closed position, the wings 22, 24 reduce their surface area as exposed to the fluid stream flowing through the ductwork 18, and thus improving the pressure drop of such barriers versus permanent baffles known in the art. The second open or deployed position of this lance injection assembly 10 is enabled as the tube 11 is pushed through the shroud 16. As the insertion occurs, the tip 19 of tube 11 pushes the wings 22, 24 to unfold outward, thus creating a much broader surface area across the flow direction of the fluid stream than the shroud 16 or port through which the tube 11 is inserted. In this embodiment, if the tube is removed, e.g., if particulate does not need to be inserted at that particular access point, then the removal of the tube 11 and its tip 19 in combination with the force of gravity will cause the wings 22, 24 to fold back inwards to their retracted position.

As those of skill will understand given the teachings of this embodiment, this embodiment of the invention can be practiced either through the case where the shroud 16 and wings 22, 24 are removable through the ductwork (when the wings are retracted or closed), or alternatively the shroud 16 may be permanently fixed to the ductwork 18, with only the tube 11 being inserted or removed as operational circumstances dictate.

FIGS. 2*a* and 2*b* show a second preferred embodiment of a lance injection assembly 20 constructed in accordance with the present invention in closed and open positions, respectively. This second preferred embodiment is in relevant part similar to the first preferred embodiment in its use of wings 22, 24. However, in this second preferred embodiment, the wings may be attached directly to the tube 21 such that the entire assembly 20 may be inserted through the port of the ductwork 18. Since the wings 22, 24 of this embodiment are attached directly to the tube 21 instead of a shroud or some other, separate structure, this embodiment requires a push rod 29 to urge the wings into a deployed position. Thus, this embodiment teaches the ability to insert and remove the entire lance injection assembly 20 through a port in the ductwork 18 such that the wings 22, 24, when opened or deployed have a larger diameter than the port of the ductwork through which it was inserted.

FIG. 3 shows a third preferred embodiment for deploying wings in accordance with the teachings of the present invention. In this embodiment, the lance assembly 30 includes wings 42, 44 which rotate radially outward to fold away from the shroud 36 to which it is attached in a hinged relationship. In this preferred embodiment, the entirety of this assembly (i.e., both the tube 31 and shroud 36 including wings 42, 44) may be inserted and removed through the port of the ductwork 18. By contrast with the first and second embodiments, however, the process of retracting the wings does not rely upon gravity, and thus this embodiment relies upon a control cable 47 or similar actuator to be used by an operator to open and close the wings 42, 44 as needed.

FIGS. 4 and 5 show a fourth preferred embodiment of a lance injection assembly 50 for deploying a propeller 52 on a support shaft 53, with the propeller comprising blades 54, 55. Each blade 54, 55 includes a flat portion 56 which is substantially perpendicular to the fluid flow, and disrupts the fluid flow and creates a zone of turbulence. Likewise, each blade 54, 55 of this embodiment includes an angled portion 57 which enables the rotation of the propeller 52 based upon the force of the fluid flow. In this embodiment the tube 51 may be deployed downstream (as in FIG. 4) or upstream of the propeller. In either configuration, this embodiment preferably may be inserted through two ports in the ductwork 58, 59 which are separate from one another but sufficiently proximate such that the propeller 52 creates a zone of turbulence near the tube 51 such that a greater dispersion of particulate passing into the fluid stream may result. The propeller 52 preferably has a greater diameter than the port in the ductwork 59 through which it is inserted. The propeller, however, may nonetheless be removed through its port 59 by aligning the propeller 52 and the support shaft 53 by a hook or similar mechanism (not shown).

Still another embodiment of the present invention is shown in FIGS. 6A and 6B, which reflect a double wing set, 22, 24 of a lance injection assembly 10. In this embodiment, the tip 19 may be used to push both wings into an unfolded or deployed position (as shown in FIG. 6B), although those of skill having the present teach will understand that other release mechanisms (e.g., lanyard actuated spring biased supports, cable actuators, separate push rods, etc.) may be used in place of the tip push mechanism employed in this embodiment. In addition, the present embodiment would typically involve deployment of both sets of wings upon actuation, variants of this assembly as shown in FIGS. 10A and 10B can also enable a partial or variable deployment (e.g., only a single set of the two sets of wings and/or partial deployment of the lower set of wings) depending upon a variety of parameters (e.g., the flow rate, the minimum level of desired dispersion of the sorbent, etc.). Such variable deployment is also possible for a variant of the single wing pair as shown in FIGS. 9A and 9B. However, applicants believe that deployment of both pair of wings would be advantageous to obtain a higher degree of dispersion than available through the single pair embodiments discussed above. Applicants have performed CFD modeling for the Double Cobra and the results predicted that for all 12 planes downstream from the injection site selected for modeling of dispersion within ductwork, mixing performance is 28 to 35% better for the two pair wing embodiment of the present invention than it is for the single wing pair embodiments.

Applicants believe that such better mixing is a function of the greater cross sectional coverage of solid particles in the sample duct work, as modeled in table 2.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the numbers of wings 22, 24 used in the preferred embodiments of present invention is for illustrative purposes with reference to the example drawings only. For instance, as shown in FIGS. 7A and 7B, and FIGS. 8A and 8B, the present invention can encompasses embodiments with one or two eccentric wings as well. Similarly, while the wings of certain preferred embodiments of the present invention are focused upon their attachment to shroud 16, those of skill will understand the applicability of the present invention to configurations whereby such attached directed to the tube for deployment upon insertion, either through a spring bias mechanism or other suitable mechanical adjustment. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed:

1. An injection lance assembly which can be inserted into a port in ductwork, the lance assembly comprising;
    a) a tube for providing particulate flow into a fluid stream within the ductwork;
    b) at least two pairs of wings which are deployable within the ductwork and may be inserted through the port with the tube; and
    c) means for actuating the wings into a deployed position; whereby the lance assembly when deployed in the ductwork has a larger diameter than the port.

2. The assembly of claim 1 wherein the means for actuating the wings into a deployed position comprises a cable actuator.

3. The assembly of claim 1 wherein the tube further comprises a tip region, the tip region providing the means for actuating the wings into a deployed position.

4. The assembly of claim 1, wherein the means for actuating the wings into a deployed position comprises a punch rod.

5. The assembly of claim 1, wherein the wings pivot radially relative to the tube.

6. The assembly of claim 1, wherein the wings are attached to the tube.

7. The assembly of claim 1, further comprising a shroud defining a channel with the tube displaceable therethrough, the least two pairs of wings being attached to the shroud.

8. The assembly of claim 1, wherein the tube comprises a plurality of tubes.

9. The assembly of claim 1, wherein the tube includes a plurality of apertures along the length of the tube.

10. The assembly of claim 9, wherein each of the plurality of apertures is at an axial location corresponding to the at least two pairs of wings.

11. The assembly of claim 1, further comprising a means for retracting the wing through the port.

12. The assembly of claim 11, wherein the means for retracting uses the same structure as the means for actuating the wings into a deployed position.

* * * * *